RADIATOR AND METHOD OF MANUFACTURE THEREFOR

Filed March 1, 1962 2 Sheets-Sheet 1

INVENTOR:
ALFRED L. JOHNSON, JR.,

BY

William E. Martin
Agent.

INVENTOR:
ALFRED L. JOHNSON, JR.,
BY
[signature]
Agent.

3,322,190
RADIATOR AND METHOD OF MANUFACTURE THEREFOR

Alfred L. Johnson, Jr., Hermosa Beach, Calif., assignor to The Garrett Corporation, Los Angeles, Calif., a corporation of California Filed Mar. 1, 1962, Ser. No. 176,546
11 Claims. (Cl. 165—46)

This invention relates generally to heat exchange apparatus and, more particularly, to heat exchangers of the type wherein the heat content of a fluent medium may be dissipated primarily through radiation. It is a fundamental aim of the invention to provide a heat exchanger which combines the advantages of relatively large radiative surface area and high mechanical strength in a thermodynamically advantageous construction of relatively light weight.

In order to maintain the temperature of a heat source within a desired operating range, it is well known to transfer heat from the source to an intermediate fluid and thence to an ambient fluid which, being at a lower temperature than the source, constitutes a suitable heat sink therefor. Apparatus for transferring heat from the intermediate to the ambient fluid in such an arrangement may commonly comprise passage means affording a plurality of flow paths for the intermediate fluid and providing a maximal external surface area for exposure to the ambient fluid, thereby to promote conductive and convective as well as radiative transfer of heat thereto. Though such apparatus may, in some applications, be referred to in colloquial usage by the term "radiator," it is to be understood that the mode of heat transfer effected thereby is, in most cases, predominantly conductive and convective rather than radiative, and that the effectiveness thereof is largely dependent on the presence of an ambient fluid to which heat may be transferred. Where the environment in which such a heat exchanger may be required to operate, however, provides only the most tenuous ambient fluid or none at all for transfer of heat thereto, it will be apparent that heat transfer in the conductive and convective modes will be substantially precluded and, under these conditions, the only mode of heat transfer which can be effected by the exchanger will be radiative. In such circumstances, the primary consideration governing the design of a heat exchange apparatus of the type described is that maximal surface area be presented for radiation of heat, and that this surface be appropriately oriented with regard to such heat sinks or absorbers as may be present in the environment. In addition, it is often desirable, as when a heat exchanger of the type described is required to define an enclosure or portion thereof, that the fluid passages whereby heat is transferred to the radiative surface be so disposed relative thereto as to incur minimal risk of adventitious impact or puncture such as might cause fluid leakage or otherwise impair the effectiveness of the heat exchanger.

In the prior art, skin or surface heat exchangers of the type described have commonly taken the form of a so-called plate-fin radiator comprising a laterally extensive sheet of heat conductive material having fluid passages embedded therein. In general, such radiators have been both difficult and costly to manufacture, have not been satisfactorily adaptable to the provision of three-dimensional surface contours, and have been too heavy for many applications. It is a primary object of the present invention, therefore, to provide a surface radiator that is substantially lighter than those heretofore known and, at the same time, is relatively easy and economical to manufacture.

It is another object of the invention to provide a construction for a surface radiator that is of relatively light weight and, at the same time, of sufficient structural rigidity to withstand severe mechanical vibration.

It is another object of the invention to provide a construction for a surface radiator which may be either plane or curved for conformity with the desired shape of an enclosure whereof it may form a part.

It is another object of the invention to provide a construction for a surface radiator which is capable of reliable operation under conditions of random puncture or adventitious impact.

It is another object of the invention to provide a relatively light weight construction for a surface radiator wherein a desired pattern of elastic behavior may be achieved by pre-stressing the structure thereof.

It is another object of the invention to provide a radiator construction wherein the structure defining the radiative surface thereof comprises a heat conductive membrane which is pre-stressed in tension.

It is another object of the invention to provide a method of manufacturing a surface radiator which embodies the aforementioned features and advantages.

The invention achieves these objects and advantages through the application of a novel method of construction whereby it is possible to utilize a radiative surface of minimal thickness and weight without sacrificing desirable properties of structural strength or resistance to mechanical vibration. In surface radiators of the prior art, as hereinbefore noted, a plurality of fluid passages may generally be embedded in a laterally extensive plate of heat conductive material, the plate being disposed so as to form a continuous web between the several passages embedded therein, and the entire assembly being of sufficient structural rigidity to withstand anticipated static and dynamic load conditions. The requirement for structural rigidity, and particularly for resistance to mechanical vibration, has in the past led to radiator constructions wherein the laterally extensive plate which forms the radiative surface or web between the fluid passages is substantially thicker than would be required on the basis of thermodynamic considerations alone. This, of course, leads to a radiator assembly that is heavier and requires a more extended period to achieve thermal equilibrium (i.e., has a greater thermodynamic time constant) than may be desirable in particular circumstances. The present invention, which overcomes these difficulties by providing a radiator that is significantly lighter in weight and has a substantially shorter thermodynamic time constant than could be achieved through previous methods of construction, completely abandons the established prior art concept of providing a fully self-supporting radiative surface having sufficient inherent rigidity to withstand anticipated dynamic as well as static loads. Instead, the radiator herein contemplated utilizes an extremely thin and consequently lightweight radiative surface which lacks sufficient inherent rigidity to be self-supporting, the requisite strength and resistance to mechanical vibration being imparted thereto by appropriately pre-stressing the structure thereof. In the novel construction comprehended by the invention, this principle is embodied in a radiator wherein a thin sheet of heat conductive material is biaxially stressed in tension so as to exhibit the elastic behavior characteristic of a membrane rather than a plate, the sheet being provided with fluid passages disposed superficially thereof, rather than embedded therein as taught by prior art. Thus the vibrational behavior of the radiative surface, and particularly the fundamental frequency thereof, may be generally described by the well known equation for the vibration of a tensed membrane, to wit:

$$f=C_m\sqrt{\frac{T}{m}}$$

in which $f$ is the fundamental frequency of vibration, $C_m$ is a constant related to the shape of the membrane, $m$ is the mass per unit area of the membrane, and T is the tension per running inch across an exemplary section thereof. By way of distinction, the corresponding equation for the behavior of a plate simply supported along its edges may be stated as follows:

$$f=C_p\sqrt{\frac{E\cdot h^2}{12(1-\mu^2)d}}$$

in which $f$ is again the fundamental frequency of vibration; $C_p$ is a constant related to the shape of the plate; $d$ is the density, $h$ is the thickness, E is the elastic modulus, and $\mu$ is Poisson's ratio for the material of the plate. It will be apparent from a comparison of the two foregoing equations, therefore, that the vibrational behavior of a membrane may be clearly distinguished from that of a plate in that the former is a function of the mass of the vibrating element and the tension prevailing therein, whereas the latter is a function of the density and elastic properties of the material comprising the element.

In a preferred embodiment, as hereinafter more particularly described with reference to the accompanying drawings, the radiator of the present invention comprises a heat conductive membrane and a supporting framework therefor, the membrane being biaxially, tensionally pre-stressed and maintained in a desired state of tension by attachment to the supporting framework. On one side of the membrane, a plurality of passages is disposed in heat transfer relation therewith and in fluid communication with a source of heat which it is desired to dissipate by radiation, the opposite surface of the membrane being exposed to the environment for radiation of thermal energy thereto. The fluid passages may be attached to the membrane by any of a number of well known means, such as welding, brazing, plastic bonding or the like, and the membrane itself may define either a plane or a curved surface to conform with the desired shape of a housing or enclosure of which it may form a part. Further details of the invention, as well as a preferred mode of manufacture therefor, will be more clearly understood by reference to the following particular description thereof, reference being had to the accompanying drawings.

In the drawings, which are to be regarded as merely illustrative and in which like elements are designated by like reference characters:

Figures 1, 2, 3, 4, 5:
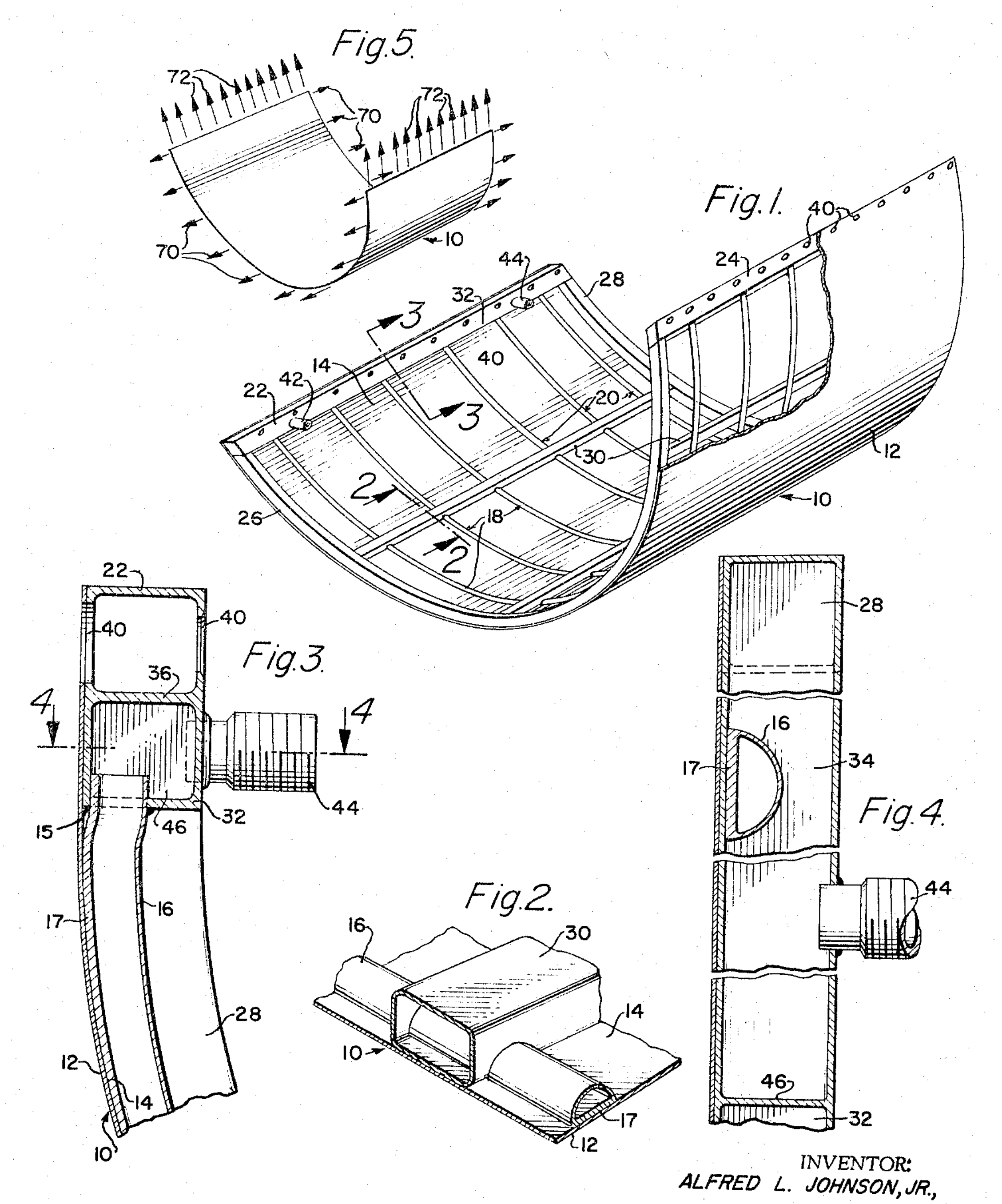
FIG. 1 is a perspective view, partially broken away, of a radiator embodying the invention.
FIG. 2 is a fragmentary view taken along the line 2—2 of FIG. 1.
FIG. 3 is a section taken along the line 3—3 of FIG. 1.
FIG. 4 is a section taken along the line 4—4 of FIG. 3.
FIG. 5 is a diagram illustrating the disposition stress relative to the surface of the radiator.

Referring first to FIG. 1 there is shown a radiator of arcuate form which comprises a tensionally pre-stressed, heat conductive membrane 10 having a convex outer surface 12 for exposure to the environment and a concave inner surface 14 on which a plurality of passages 16 are aligned for circulation of fluid in heat transfer relation therewith, the passages 16 preferably being arranged in two groups comprising a first pass 18 and a second pass 20. The passage 16 may be attached to the membrane 10 by welding, such as shown at 15 in FIG. 3, or by brazing, plastic bonding or the like, as discussed more fully hereinafter. It is to be understood that the material comprising the membrane 10 may be of minimal thickness consonant with the heat load to be radiatively dissipated thereby and, therefore, may inherently lack sufficient structural rigidity to be adequately self-supporting. According to the present invention, however, the requisite stiffness to withstand anticipated static and dynamic load conditions and to place the fundamental vibrational mode of the membrane at a desired frequency is imparted thereto by establishing a tensional pre-stress therein in a manner to be more particularly described hereinafter.

The pre-stressed membrane 10 is supported and maintained in the desired state of tension by means of a peripherally disposed, substantially rigid framework comprising a pair of side members 22, 24 and a pair of end members 26, 28, the respective members being fixedly connected to each other, as by well known means, at their respectively adjoining ends. Preferably, the end members 26, 28 which are of arcuate shape to conform with the desired contour of the surface 12, are maintained in accurate spaced relation to each other, against the urging of the tensile stress in the membrane 10, by means of spaced compression members or struts 30, the latter being disposed substantially parallel to side members 22, 24 and relieved at appropriately spaced intervals, as shown in FIG. 2, to accommodate the passages 16. The side member 22, which may be of rectangular cross section as shown in FIG. 3, includes a longitudinal duct or header 32 and the side member 24 includes a similar header 34 whereby the passages 16 may be placed in flow communication with each other and with a source of heat transfer fluid, each of the headers 32, 34 being isolated, as by axially aligned partitions 36, 38 respectively, from the contiguous outer portions of the side members 22, 24 wherein suitable apertures 40 may be provided to accommodate bolts or similar fastenings for attachment of the radiator to adjoining structure. In addition, the side member 22 includes an inlet port 42, an outlet port 44 and a medially disposed, transverse partition 46 whereby the header 32 is divided into an inlet portion and an outlet portion for communication, respectively, with the passages 16 of first pass 18 and second pass 20. Thus, in the design shown, fluid admitted via the inlet port 42 is conducted by way of the passages 16 comprising first pass 18 to the header 34 and thence via the passages comprising second pass 20 and the outlet portion of header 32 to outlet port 44. As the passages 16 are disposed in heat exchange relation with the membrane 10, it will be apparent that a portion of the heat content of fluid circulated through the former will be transferred to the latter and radiatively dissipated, via the convex outer surface 12, to the environment.

The passages 16 may preferably be of approximately D-shaped cross section to provide a substantially flat wall 17 of suitable area for mechanical union with and advantageous heat transfer to the inner surface 14 of membrane 10, the respective passages being welded, soldered, brazed, plastically bonded or otherwise sealably secured in side members 22, 24 for flow communication with headers 32, 34 provided therein. It will be apparent that the thickness of the membrane 10 added to that of the walls 17 of the passages 16 will afford a significant measure of protection against puncture or crushing of the fluid passages due to adventitious impact on the outer surface 12; and, if it is desired to augment this protection, the thickness of walls 17 may, of course, be increased in accordance with such probability of random impact as may be anticipated in the environment in which the radiator is to be used. Further, it will be apparent that while random puncture of the membrane 10 will have relatively little effect on the efficiency of the radiator as a whole, puncture of any one of the passages 16 will result in leakage of the fluid therein and, eventually, in total loss of the effectiveness of the radiator. In the instant design, which comprehends a composite rather than a homogeneous structure, this hazard may be substantially mitigated through judicious selection of structural materials. Thus, the membrane 10 may be of aluminum, for example, to provide an efficient, specular radiative surface of minimal weight, and the fluid passages 16 may be of steel or other material combining relatively high heat conductivity with advantageous mechanical resistance to crushing or puncture. Other combinations of materials may, of course, be used or, if desired, the entire structure may be fabricated of a single material such as steel, aluminum, copper, silver, beryllium or other metal, alloy or heat conductive material which combines structural and thermodynamic characteristics appropriate to particular circumstances of use.

It is to be understood that the radiator shown in the drawing is merely exemplary and is intended to illustrate the manner in which the novel construction comprehended herein may be adapted to a variety of surface contours for conformity with the preferred geometry of an enclosure or other structure in which it may be desired to incorporate a radiative surface embodying the invention. As will become apparent in the following description of a preferred mode of manufacture therefor, the radiator construction of the present invention may provide either a plane or curved radiative surface and may conform to a variety of desired outline shapes. Since the mode of manufacture for a radiator having a curved surface, as shown in FIG. 1 of the drawing, may be considered the more general case, the following discussion will be directed thereto. Though the method of manufacture hereinafter described makes use of a plastic bonding technique for structurally uniting the various elements of the radiator, it will be apparent to those skilled in the art that the invention is by no means limited thereto, such well known methods of joining as welding, brazing, soldering or the like being also adaptable to the requirements of the described method of manufacture.

Figure 6:
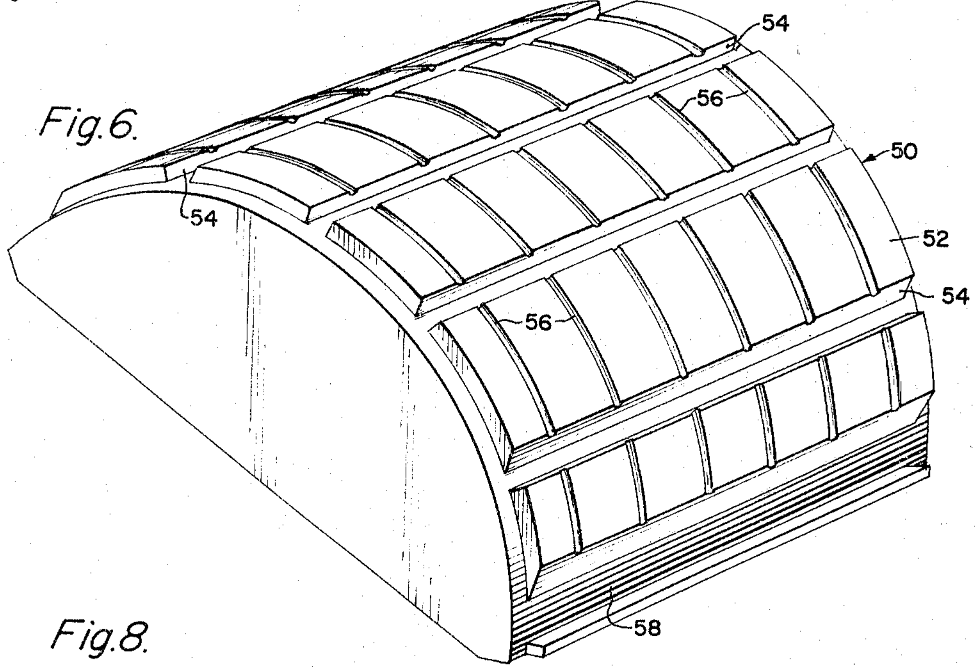
FIG. 6 is a perspective view illustrating a die used in the manufacture of a radiator embodying the invention.
Figure 8:
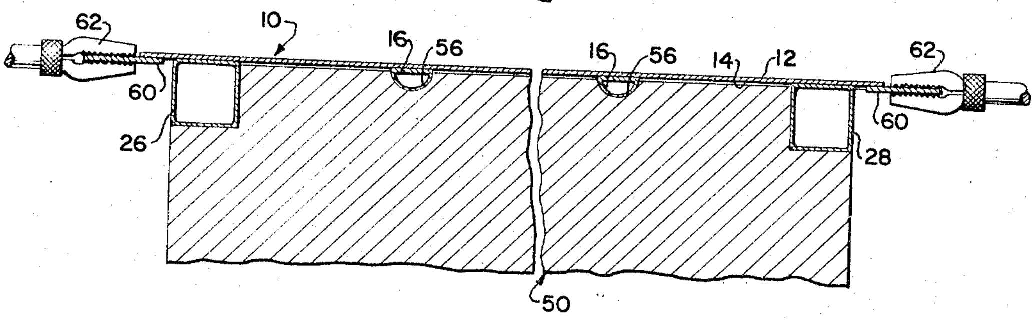
FIG. 8 is a section taken along the line 8—8 of FIG. 7 and illustrating another step in the manufacture.

Referring to FIG. 6 of the drawing there is shown a die 50 having a surface 52 of slightly more acute curvature than the desired contour of the membrane 10, the die being appropriately grooved, as at 54, 56 to permit struts 30 and passages 16, respectively, to be recessed therein so as to lie substantially flush with the surface 52 as shown. In addition, the die 50 may preferably include peripheral grooves 58 to accommodate the supporting framework comprising side members 22, 24 and end members 26, 28, the grooves 54, 56, 58 being provided with appropriate draft, as is more clearly shown in FIG. 7, to permit extraction of the finished radiator assembly from the die.

The membrane 10 may comprise a sheet of metal, such as aluminum, of the desired thickness and of slightly greater lateral dimensions than the desired size of the finished radiator, the sheet being prepared for assembly by fixedly attaching thereto, as by spot welding or the like, a pair of oppositely disposed marginal flanges 60, the space between the inner edges of the respective flanges being slightly shorter than the desired final dimension between the outer edges of end members 26, 28. The exposed, upper surfaces of the passages 16, structs 30 and frame members 22, 24, 26, 28 are prepared for assembly with the membrane 10 by coating them with a suitable plastic bonding compound, such as an epoxy resin which may have particles of silver, copper or other suitable material dispersed therein to improve the thermal conductivity of the resulting joint.

Figure 7:
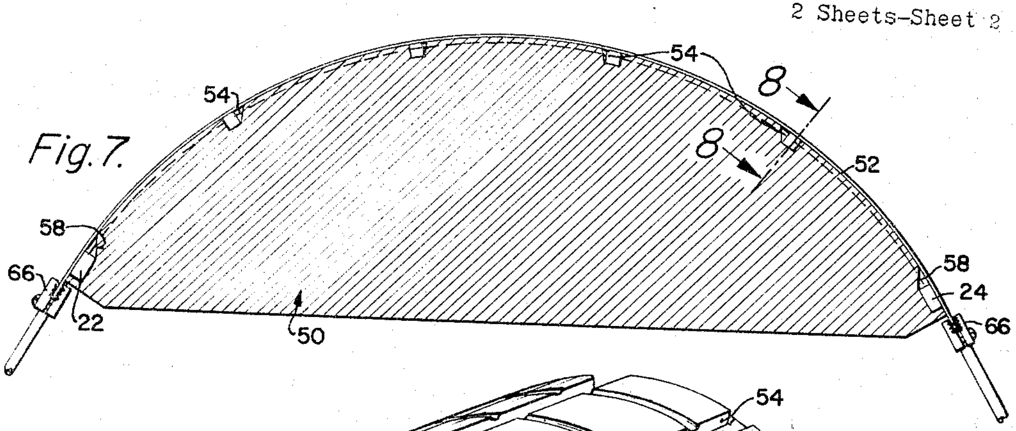
FIG. 7 is a fragmentary section taken along the line 7—7 of FIG. 6 and illustrating a step in the manufacture.

With the marginal flanges 60 engaged by the jaws 62 of an appropriate tensioning device (not shown) the membrane 10 is longitudinally stretched until the inner edges of the flanges 60 may be brought into engagement with the outer edges of end member 26, 28, as shown in FIG. 7, the initial engagement between the respective edges preferably being along a line located approximately medially of the arc formed by the surface 52 and substantially parallel with side members 22, 24. The membrane 10 is then worked down on both sides of the initial line of contact until both of the marginal flanges 60 are fully engaged throughout their respective lengths with the edges of end members 26, 28, the longitudinal strain whereby the membrance 10 accommodates this engagement, as determined by the aforementioned spacing of marginal flanges 60 relative to end frames 26, 28, preferably being such as to give rise to a corresponding stress of not more than a few hundred pounds per square inch.

When the flanges 60 have been fully engaged with the edges of end members 26, 28, thereby bringing the membrane 10 into conformity with the curvature of the die surface 52, a circumferential stress, which may preferably be as high as two or three thousand pounds per square inch, may be applied to the membrane by means of a suitable tensioning device as generally indicated by the jaws 66 in FIG. 7. In consequence of the strain due to this tension and the longitudinal restraint imposed on the membrane by the engagement of flanges 60 with end frames 26, 28, the longitudinal stress in the membrane will be increased by an amount proportional to Poisson's ratio for the material thereof. Thus, if the membrane is of aluminum, for which Poisson's ratio is approximately 0.33, and the applied circumferential stress is 3000 p.s.i., the resulting longitudinal stress will be 1000 p.s.i. plus the initial stress imposed by engagement of flanges 60 with end members 26, 28.

With the membrane 10 under combined longitudinal and circumferential stress as described, the bonding areas of the passages 16, structs 30, and frame members 22, 24, 26, 28 may be heated by any suitable means to an appropriate temperature for curing the epoxy resin bonding compound. When the plastically bonded joints have been satisfactorily cured, the radiator assembly may be extracted from the die 50 for removal of surplus material from the membrane 10, the process of extraction being facilitated by releasing the jaws 66 and thus permitting the radiator to assume a slightly enlarged radius of curvature, corresponding to the desired final value thereof, under the influence of the circumferential tension established in the membrane 10. After the radiator has been extracted from the die, surplus material, including marginal flanges 60, may be trimmed from the edges of membrane 10 to provide a finished assembly as shown in FIGS. 1 through 4, the pattern of tensional pre-stress therein being substantially as shown diagrammatically in FIG. 5.

In FIG. 5, the axially directed arrows 70 indicate the tensional stress longitudinally of the membrane 10, and the tangentially directed arrows 72 indicate the tensional stress circumferentially thereof, it being understood that for a radiator having a flat, rather than a curved surface, the arrows 70 and 72 would be coplanar and substantially orthogonally aligned. Though the arrows 72 have been here illustrated as somewhat larger than the arrows 70, in accordance with the relative magnitudes of the circumferential and longitudinal stress as hereinbefore described, it is to be understood that the invention is by no means limited to such a relationship of stresses, but may, in fact, comprehend a radiative membrane wherein any of a variety of patterns of tensional pre-stress may prevail in accordance with design requirements suited to particular circumstances. Further, though the invention has been herein described with reference to an embodiment wherein a tensionally pre-stressed membrane is supported by means of a frame disposed peripherally thereof, such description is not intended by way of limitation, it being contemplated that alternate forms and arrangements of supporting framework may also be adapted to the requirements of the invention. For example, it is anticipated that a supporting frame for a radiative membrane according to the invention may, in certain instances, comprise two intersecting members disposed transversely of each other and diagonally of the membrane, the juncture of the two members being suitably braced to react such forces or moments thereon as may be due to the tensional pre-stress in the membrane. Still other forms of supporting frame may, of course, be devised to meet the requirements of pre-stressed radiative membranes suited to particular applications, and it is intended that all such forms and variations be construed as falling within the scope of the invention.

As will be apparent from the foregoing description, the present invention provides a novel construction and method of manufacture therefor whereby a surface radiator of exceptional lightness and strength may be achieved. Though the construction and method of manufacture have been herein described with reference to a particular embodiment, it is anticipated that those skilled in the art will have occasion to practise numerous variations on specific features thereof, and it is my desire that all such variations falling within the spirit and scope of the invention be secured to me by Letters Patent.

I claim:

1. A radiator which comprises:
(a) a heat conductive membrane having a first surface for absorbing heat and a second surface for radiating said heat, said membrane being pre-stressed in tension;
(b) a supporting frame disposed biaxially of said membrane and fixedly attached thereto for maintaining said tension; and
(c) passage means disposed superficially of said membrane for circulating fluid in heat exchange relation with said first surface thereof.

2. A radiator which comprises:
(a) a heat conductive membrane having a first surface for absorbing heat and a second surface for radiating said heat, said membrane being biaxially pre-stressed in tension;
(b) a supporting frame disposed peripherally of said membrane and fixedly attached thereto for maintaining said tension; and
(c) passage means disposed superficially of and connected to said membrane for circulating fluid in conductive heat exchange relation with said first surface thereof whereby said heat may be radiated from said second surface.

3. A radiator which comprises:
(a) a heat conductive membrane having a first surface for absorbing heat, and a second surface for radiating said heat, said membrane being pre-stressed in tension;
(b) a supporting frame disposed adjacent one of said surfaces and fixedly attached thereto for maintaining said tension, said frame including inlet and outlet means for connection in circuit with a source of heat transfer fluid; and
(c) passage means disposed superficially of said membrane and connected in circuit between said inlet and outlet means for circulating said fluid in heat exchange relation with said first surface whereby the heat content of said fluid may be radiatively dissipated by said second surface.

4. A radiator which comprises:
(a) a heat conductive membrane having a first surface for absorbing heat and a second surface for radiating said heat, said membrane being pre-stressed in tension;
(b) a supporting frame disposed peripherally of said membrane and fixedly attached thereto for maintaining said tension; said frame including inlet and outlet means for connection in circuit with a source of heat transfer fluid; and
(c) passage means disposed superficially of said membrane and connected in circuit between said inlet and outlet means for circulating said fluid in heat exchange relation with said first surface whereby the heat content of said fluid may be radiatively dissipated by said second surface.

5. A radiator which comprises:
(a) a heat conductive membrane having a first surface for absorbing heat and a second surface for radiating said heat, said membrane being biaxially pre-stressed in tension;
(b) a supporting frame disposed biaxially of said membrane and fixedly attached thereto for maintaining said tension, said frame including an inlet header and an outlet header having corresponding inlet and outlet ports for connection in circuit with a source of heat transfer fluid; and
(c) passage means disposed superficially of said membrane and in heat conductive relation with said first surface thereof, said passage means being connected in circuit between said inlet header and said outlet header for circulation of said fluid in heat exchange relation with said first surface whereby the heat content of said fluid may be radiatively dissipated by said second surface.

6. A radiator which comprises:
(a) a heat conductive membrane having a first surface for absorbing heat and a second surface for radiating said heat, said surfaces being curved and said membrane being pre-stressed in tension;
(b) a supporting frame disposed peripherally of said membrane and fixedly attached thereto for maintaining said tension and the curvature of said surfaces, said frame including header means having an inlet port and outlet port for connection in circuit with a source of heat transfer fluid; and
(c) passage means disposed superficially of said membrane, and in heat conductive relation with said first surface thereof, said passage means being connected in circuit with said header means to conduct said fluid from said inlet to said outlet in heat exchange relation with said first surface whereby the heat content of said fluid may be radiatively dissipated to the environment of said radiator by said second surface.

7. A radiator for incorporation in the wall of an enclosure which comprises:
(a) a heat conductive membrane having a first surface for absorbing heat and a second surface for radiating said heat, said membrane being pre-stressed in tension, and said surfaces being curved to conform with the desired shape of the enclosure;
(b) a supporting frame disposed peripherally of said membrane, and fixedly attached thereto for maintaining said tension, said frame including curved members for maintaining the desired curvature of said surfaces;
(c) header means formed integrally with said frame and having inlet and outlet portions for connection in circuit with a source of heat transfer fluid; and
(d) passage means comprising a plurality of tubes disposed superficially of and connected to said first surface and in heat conductive relation therewith, said passage means being connected in circuit between the inlet and outlet portions of said header means for circulating said fluid in heat exchange relation with said membrane.

8. A surface radiator for incorporation in a curved wall of an enclosure which comprises:
(a) a heat conductive membrane having a first surface for absorbing heat and a second surface for radiating said heat, said membrane being biaxially pre-stressed in tension, and said surfaces being curved to conform with the desired shape of the enclosure;
(b) a supporting frame disposed peripherally of said membrane adjacent said first surface thereof and fixedly attached thereto for maintaining said tension, said frame including a pair of side members and a pair of end members, the latter being of arcuate form for maintaining the desired curvature of said surfaces;
(c) a header formed integrally with each of said side members, one of said headers being divided into an inlet portion and an outlet portion for connection in circuit with a source of heat transfer fluid; and (d) passage means defining a first pass connecting said inlet portion of said one header with said other header and a second pass connecting said other header with said outlet portion of said one header;

(e) said passage means comprising a plurality of tubes of substantially D-shaped cross section, the flat porton of said tubes being disposed in heat conductive relation with said first surface of said membrane.

9. A method of manufacturing a surface radiator of the type comprising a tensionally pre-stressed membrane, passage means disposed in heat transfer relation with a surface of said membrane and a supporting frame therefor which comprises:

(a) applying tension to said membrane parallel to a first axis thereof;

(b) mechanically engaging said membrane with said frame to maintain said tension;

(c) applying tension to said membrane parallel to a second axis thereof disposed transversely of said first axis;

(d) fixedly attaching said membrane to said frame and said passage means; and (e) releasing the application of said tension parallel to said second axis when said attachment has been completed.

10. A method of manufacturing a surface radiator of the type comprising a tensionally pre-stressed membrane, passage means disposed in heat transfer relation with a surface of said membrane and a supporting frame therefor which comprises:

(a) engaging said frame with said membrane so as to provide mechanical restraint for the latter parallel to a first axis thereof;

(b) applying tension to said membrane parallel to a second axis thereof, said second axis being aligned transversely of said first axis whereby a stress proportional to said applied stress will be developed parallel to said first axis in consequence of said restraint;

(c) fixedly attaching said membrane to said frame and said passage means; and (d) releasing the application of said tension when said attachment has been completed.

11. A method of manufacturing a surface radiator of the type comprising a tensionally pre-stressed membrane, passage means disposed in heat transfer relation with a surface of said membrane, and a supporting frame for said membrane and said passage means which comprises:

(a) assembling said frame and said passage means in desired relation with each other;

(b) applying tension to said membrane parallel to a first axis thereof;

(c) mechanically engaging said membrane with said frame to maintain said tension;

(d) applying tension to said membrane parallel to a second axis thereof disposed transversely of said first axis;

(e) bonding said membrane to said frame and said passage means to form a unitary structure; and (f) releasing the application of said tension parallel to said second axis when said bonding has been completed.

References Cited

UNITED STATES PATENTS

| | | | |
|---|---|---|---|
| 1,040,929 | 10/1912 | Golden | 165—169 |
| 1,833,291 | 11/1931 | Kraenzlein et al. | 165—171 X |
| 1,968,780 | 7/1934 | Kaestner | 113—118 |
| 1,995,167 | 3/1935 | Battles | 62—126 |
| 2,110,752 | 3/1938 | Wright | 29—448 |
| 2,424,795 | 7/1947 | Burns | 165—171 X |
| 2,436,389 | 2/1948 | Kleist | 62—126 |
| 2,441,858 | 5/1948 | Watter | 29—448 |
| 2,567,716 | 9/1951 | Kritzer | 29—157.3 |
| 2,582,358 | 1/1952 | Schoellerman | 113—118 |
| 2,594,232 | 4/1952 | Stockstill | 165—171 |
| 2,722,732 | 11/1955 | Sandberg | 165—171 X |
| 2,940,737 | 6/1960 | Sandberg | 165—171 |
| 2,961,222 | 11/1960 | Butt | 165—166 |
| 2,963,779 | 12/1960 | Mosgard-Jensen | 29—157.3 |
| 3,046,639 | 7/1962 | Freyholdt | 29—157.3 |
| 3,093,348 | 6/1963 | Schelp et al. | 244—117.1 X |
| 3,106,015 | 10/1963 | Herbert | 29—455 X |
| 3,127,530 | 3/1964 | White | 165—46 X |

OTHER REFERENCES

Timoshinko and Woinowsky-Kriger: Theory of Plates and Shells, 2nd edition, 1959.

Mansfield: The Bending and Stretching of Plates, 1964 edition.

ROBERT A. O'LEARY, *Primary Examiner.*

CHARLES SUKALO, MEYER PERLIN, *Examiners.*

W. E. WAYNER, *Assistant Examiner.*